US012752774B2

(12) United States Patent
Yokoo et al.

(10) Patent No.: US 12,752,774 B2
(45) Date of Patent: Oct. 6, 2026

(54) MOVING BODY, CONTROL METHOD AND STORAGE MEDIUM

(71) Applicant: HONDA MOTOR CO., LTD., Tokyo (JP)

(72) Inventors: Yoshitaka Yokoo, Tokyo (JP); Yuki Hara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 18/429,495

(22) Filed: Feb. 1, 2024

(65) Prior Publication Data

US 2025/0249892 A1 Aug. 7, 2025

(51) Int. Cl.
*B60W 30/09* (2012.01)
*B60W 50/14* (2020.01)

(52) U.S. Cl.
CPC ....... *B60W 30/09* (2013.01); *B60W 2050/146* (2013.01); *B60W 2520/10* (2013.01)

(58) Field of Classification Search
CPC ........... B60W 30/09; B60W 2050/146; B60W 2520/10; B60W 50/0098; B60W 2520/105; B60W 40/064; B60W 2520/26; B60W 2520/266; B60W 50/082; B60W 50/14; B60W 30/182; B60W 2555/20
See application file for complete search history.

(56) References Cited

U.S. PATENT DOCUMENTS

2015/0291216 A1* 10/2015 Sato .................. B62D 15/0265 701/41
2018/0001895 A1* 1/2018 Fairgrieve ........... B60W 30/182
2022/0032897 A1* 2/2022 Moriya ........... B60W 30/18172
2023/0339515 A1* 10/2023 Hayakawa ........ B60W 60/0027

FOREIGN PATENT DOCUMENTS

JP 2017-04472 * 2/2017 ................ B60T 7/12
JP 2017-024472 A 2/2017

* cited by examiner

*Primary Examiner* — Russell Frejd
*Assistant Examiner* — Ana D Thomas
(74) *Attorney, Agent, or Firm* — Paratus Law Group, PLLC

(57) ABSTRACT

A drive assistance controller of a moving body executes driving assist control when a first travel mode is set, is capable of executing driving assist limitation control for limiting execution of the driving assist control more than when the first travel mode is set, when a second travel mode different from the first travel mode is set, executes the driving assist limitation control when the second travel mode is set and a behavior state or an environment state is a first state, and does not execute the driving assist limitation control when the second travel mode is set and the behavior state or the environment state is a second state different from the first state.

12 Claims, 7 Drawing Sheets (FIG. 1 CONTINUED)
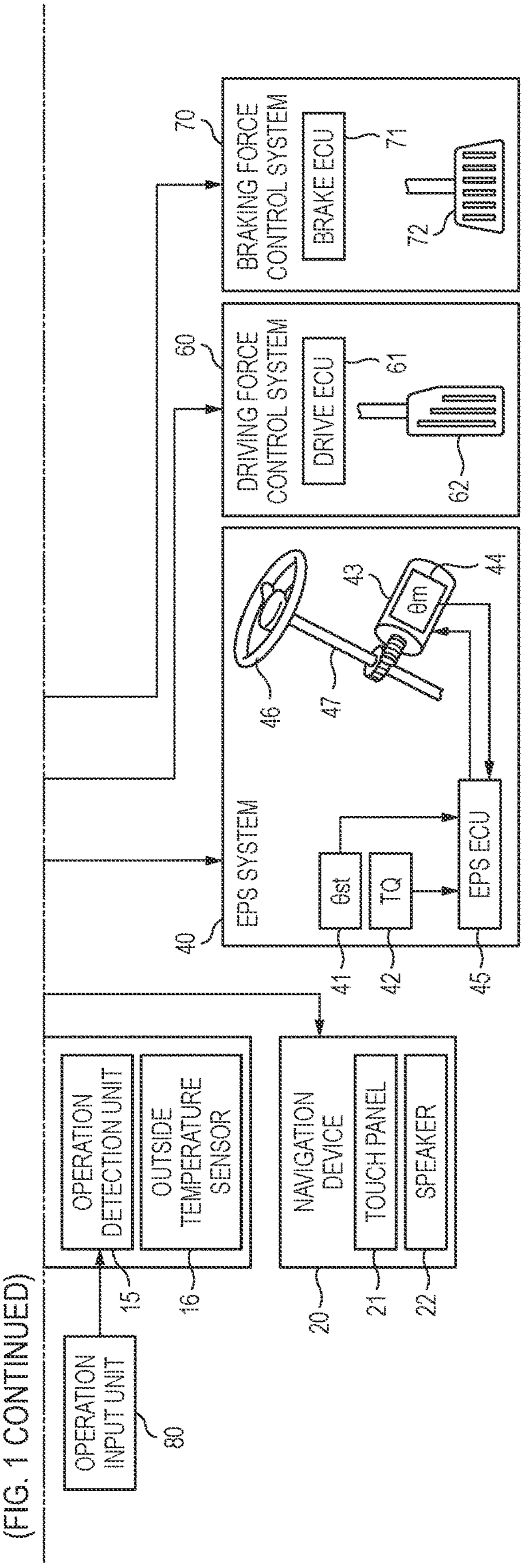

FIG. 2

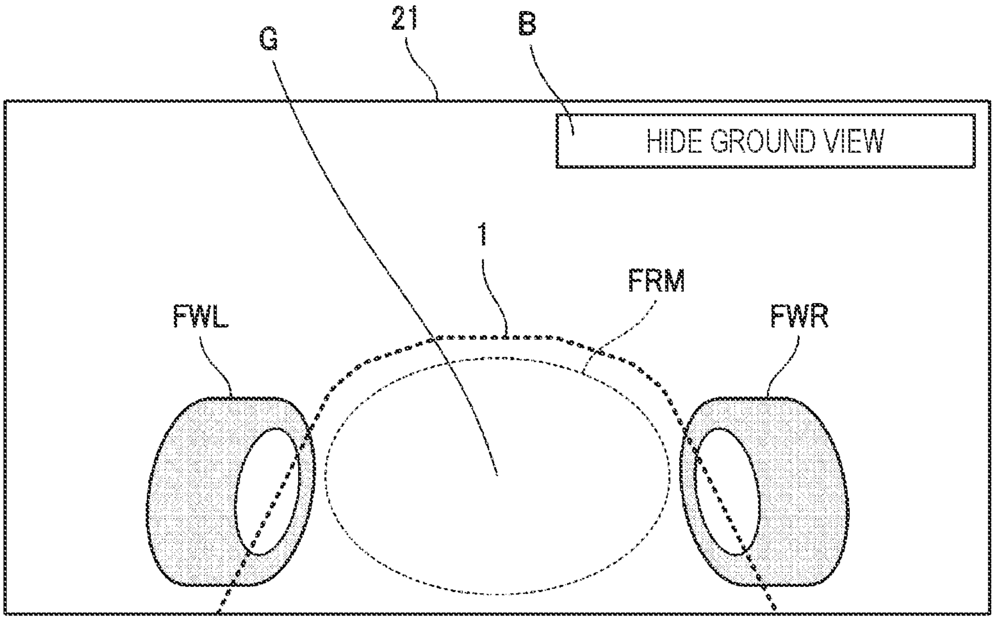

FIG. 3

T1

| TRAVEL MODE | BEHAVIOR STATE OF VEHICLE | PRESENCE OR ABSENCE OF DRIVING ASSIST LIMITATION CONTROL |
|---|---|---|
| NORMAL MODE | REGARDLESS | NO DRIVING ASSIST LIMITATION CONTROL (APPROPRIATELY EXECUTE COLLISION PREVENTION CONTROL) |
| OFF-ROAD MODE | VEHICLE SPEED IS SMALLER THAN THRESHOLD (WITH GROUND VIEW IMAGE) | WITH DRIVING ASSIST LIMITATION CONTROL (NOT TO EXECUTE COLLISION PREVENTION CONTROL) |
| | VEHICLE SPEED IS EQUAL TO OR LARGER THAN THRESHOLD (NO GROUND VIEW IMAGE) | NO DRIVING ASSIST LIMITATION CONTROL (APPROPRIATELY EXECUTE COLLISION PREVENTION CONTROL) |

FIG. 6

T2

| TRAVEL MODE | ENVIRONMENT STATE AROUND VEHICLE | PRESENCE OR ABSENCE OF DRIVING ASSIST LIMITATION CONTROL |
|---|---|---|
| NORMAL MODE | REGARDLESS | NO DRIVING ASSIST LIMITATION CONTROL (APPROPRIATELY EXECUTE DRIVING ASSIST CONTROL) |
| SNOW MODE | OUTSIDE TEMPERATURE IS LOWER THAN THRESHOLD | WITH DRIVING ASSIST LIMITATION CONTROL (NOT TO EXECUTE COLLISION PREVENTION CONTROL) |
| | OUTSIDE TEMPERATURE IS HIGHER THAN THRESHOLD | NO DRIVING ASSIST LIMITATION CONTROL (APPROPRIATELY EXECUTE DRIVING ASSIST CONTROL) |

FIG. 7

T3

| TRAVEL MODE | BEHAVIOR STATE OF VEHICLE | PRESENCE OR ABSENCE OF DRIVING ASSIST LIMITATION CONTROL |
|---|---|---|
| NORMAL MODE | REGARDLESS | NO DRIVING ASSIST LIMITATION CONTROL (APPROPRIATELY EXECUTE DRIVING ASSIST CONTROL) |
| SAND MODE | SLIP OCCURS OR THERE IS ROTATION NUMBER DIFFERENCE BETWEEN LEFT AND RIGHT WHEELS | WITH DRIVING ASSIST LIMITATION CONTROL (NOT TO EXECUTE DRIVING ASSIST CONTROL) |
| | NO SLIP OCCURS OR THERE IS NO ROTATION NUMBER DIFFERENCE BETWEEN LEFT AND RIGHT WHEELS | NO DRIVING ASSIST LIMITATION CONTROL (APPROPRIATELY EXECUTE DRIVING ASSIST CONTROL) |

*FIG. 8*

T4

| TRAVEL MODE | BEHAVIOR STATE OF VEHICLE | PRESENCE OR ABSENCE OF DRIVING ASSIST LIMITATION CONTROL |
|---|---|---|
| NORMAL MODE | REGARDLESS | NO DRIVING ASSIST LIMITATION CONTROL (APPROPRIATELY EXECUTE DRIVING ASSIST CONTROL) |
| TRACK MODE | VEHICLE SPEED OR ACCELERATION IS EQUAL TO OR LARGER THAN THRESHOLD | WITH DRIVING ASSIST LIMITATION CONTROL (NOT TO EXECUTE DRIVING ASSIST CONTROL) |
| | VEHICLE SPEED OR ACCELERATION IS SMALLER THAN THRESHOLD | NO DRIVING ASSIST LIMITATION CONTROL (APPROPRIATELY EXECUTE DRIVING ASSIST CONTROL) |

MOVING BODY, CONTROL METHOD AND STORAGE MEDIUM

TECHNICAL FIELD

The present disclosure relates to a moving body, a control method, and a storage medium.

BACKGROUND

In recent years, attempts have been made to provide access to a sustainable transportation system in consideration of vulnerable traffic participants. As one of these efforts, research and development on driving assist techniques and automated driving techniques for moving bodies (vehicles such as automobiles) have been made in order to improve safety and convenience of traffic.

One of the driving assist techniques is, for example, deceleration control for decelerating a vehicle when it is determined that the vehicle may collide with an obstacle, and/or collision prevention control for issuing a predetermined alarm to an occupant of the vehicle.

Japanese Patent Application Laid-Open Publication No. 2017-024472 discloses a technique, for a vehicle capable of switching between a normal travel mode and an off-road travel mode in which a larger torque is obtained at a lower speed than in the normal travel mode, of prohibiting execution of collision avoidance assist control for assisting a driver to avoid a collision between the host vehicle and an obstacle when a travel mode selected by the driver is the off-road travel mode.

However, as in the related-art technique, when driving assist control such as the collision avoidance assist control is completely prohibited in a certain travel mode, inconvenience may occur.

For example, in the related-art technique, even if the travel mode selected by the driver is the off-road travel mode, it does not necessarily mean that the vehicle is actually traveling on a rough road, and the vehicle may be traveling on an ordinary road. In such a case, it is also undesirable to prohibit execution of the collision avoidance assist control from a viewpoint of safety.

The present disclosure provides a moving body, a control method, and a storage medium that are capable of more appropriately executing driving assist limitation control for limiting execution of driving assist control for assisting driving of the moving body.

SUMMARY

A first aspect of the present disclosure relates to a moving body having a plurality of travel modes with different travel characteristics, the moving body including:

a control device, in which the control device includes:

a setting unit configured to set any one of the plurality of travel modes;

an acquisition unit configured to acquire information indicating a behavior state of the moving body or an environment state around the moving body; and a driving assist controller configured to execute driving assist control for assisting driving of the moving body, and the driving assist controller executes the driving assist control when a first travel mode is set by the setting unit, the driving assist controller is configured to execute driving assist limitation control for limiting execution of the driving assist control more than when the first travel mode is set, when a second travel mode different from the first travel mode is set, the driving assist controller executes the driving assist limitation control when the second travel mode is set and the behavior state or the environment state indicated by the information acquired by the acquisition unit is a first state, and the driving assist controller does not execute the driving assist limitation control when the second travel mode is set and the behavior state or the environment state indicated by the information acquired by the acquisition unit is a second state different from the first state.

A second aspect of the present disclosure relates to control method performed by a computer that controls a moving body having a plurality of travel modes with different travel characteristics, the control method including:

setting any one of the plurality of travel modes;

acquiring information indicating a behavior state of the moving body or an environment state around the moving body; and executing driving assist control for assisting driving of the moving body, in which the executing comprises:

executing the driving assist control when a first travel mode is set by processing of the first step;

executing driving assist limitation control for limiting execution of the driving assist control more than when the first travel mode is set, when a second travel mode different from the first travel mode is set;

executing the driving assist limitation control when the second travel mode is set and the behavior state or the environment state indicated by the information acquired by processing of the second step is a first state; and not executing the driving assist limitation control when the second travel mode is set and the behavior state or the environment state indicated by the information acquired by the processing of the second step is a second state different from the first state.

A third aspect of the present disclosure relates to a non-transitory computer-readable storage medium storing a program for causing a computer to execute the control method described above.

BRIEF DESCRIPTION OF DRAWINGS

FIG. 2 is a diagram showing an example of a ground view image GV;

FIG. 3 is a diagram showing an example of vehicle control by a control device 30;

FIG. 6 is a diagram showing an example of vehicle control by the control device 30 according to a first modification;

FIG. 7 is a diagram showing an example of vehicle control by the control device 30 according to a second modification; and FIG. 8 is a diagram showing an example of vehicle control by the control device 30 according to a third modification.

DESCRIPTION OF EMBODIMENTS

Figure 1:
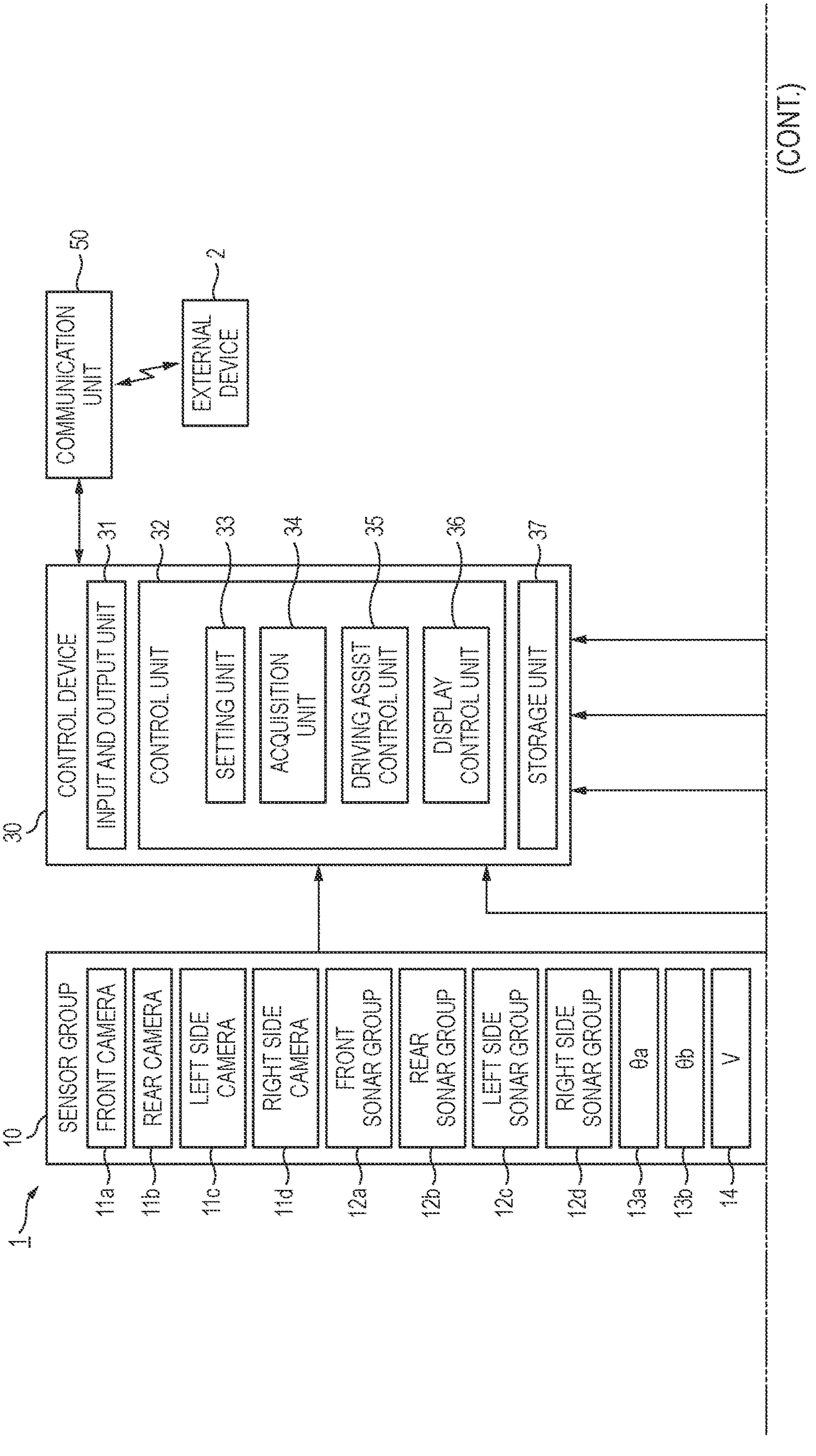
FIG. 1 is a diagram showing a vehicle 1 that is a moving body according to an embodiment of the present disclosure.

Hereinafter, an embodiment of a moving body, a control method, and a storage medium according to the present disclosure will be described in detail. The drawings are viewed from directions of reference numerals.

Not all combinations of features to be described in the following embodiments are not necessarily essential for the present disclosure. Two or more features among a plurality of features to be described in the following embodiment may be combined as desired. Hereinafter, the same or similar elements are denoted by the same or similar reference numerals, and description thereof may be appropriately omitted or simplified.

Configuration of Vehicle

FIG. 1 is a diagram showing a vehicle 1 that is a moving body according to an embodiment of the present disclosure. The vehicle 1 shown in FIG. 1 is an automobile including a drive source, and wheels (all not shown) including drive wheels driven by power of the drive source and steered wheels that are steerable. For example, the vehicle 1 is a four-wheeled automobile including a pair of left and right front wheels and a pair of left and right rear wheels. The drive source of the vehicle 1 may be an electric motor, an internal combustion engine such as a gasoline engine or a diesel engine, or a combination of an electric motor and an internal combustion engine. The drive source of the vehicle 1 may drive the pair of left and right front wheels, the pair of left and right rear wheels, or four wheels including the pair of left and right front wheels and the pair of left and right rear wheels. Either the front wheels or the rear wheels may be steered wheels that are steerable, or the front wheels and the rear wheels may both be steered wheels that are steerable. Details will be described later, and the vehicle 1 has a plurality of travel modes with different travel characteristics.

As shown in FIG. 1, the vehicle 1 includes a sensor group 10, a navigation device 20, a control device 30, an electric power steering system (EPS system) 40, a communication unit 50, a driving force control system 60, a braking force control system 70, and an operation input unit 80.

The sensor group 10 acquires various detection values related to the vehicle 1 or a periphery of the vehicle 1. The detection values acquired by the sensor group 10 are transmitted to the control device 30 and used for controlling the vehicle 1 by the control device 30.

The sensor group 10 includes, for example, a front camera 11*a*, a rear camera 11*b*, a left side camera 11*c*, a right side camera 11*d*, a front sonar group 12*a*, a rear sonar group 12*b*, a left side sonar group 12*c*, and a right side sonar group 12*d*.

The front camera 11*a*, the rear camera 11*b*, the left side camera 11*c*, and the right side camera 11*d* output, to the control device 30, image data on peripheral images obtained by capturing images of the periphery of the vehicle 1. The peripheral images captured by the front camera 11*a*, the rear camera 11*b*, the left side camera 11*c*, and the right side camera 11*d* are also referred to as a front image, a rear image, a left side image, and a right side image, respectively. An image formed by the left side image and the right side image is also referred to as a side image.

The front sonar group 12*a*, the rear sonar group 12*b*, the left side sonar group 12*c*, and the right side sonar group 12*d* emit sound waves to the periphery of the vehicle 1 and receive reflected sounds from other objects. The front sonar group 12*a* includes, for example, four sonars. The sonars forming the front sonar group 12*a* are respectively provided on an obliquely left front side, a front left side, a front right side, and an obliquely right front side of the vehicle 1. The rear sonar group 12*b* includes, for example, four sonars. The sonars forming the rear sonar group 12*b* are respectively provided on an obliquely left rear side, a rear left side, a rear right side, and an obliquely right rear side of the vehicle 1. The left side sonar group 12*c* includes, for example, two sonars. The sonars forming the left side sonar group 12*c* are respectively provided in the front of a left side and in the rear of the left side of the vehicle 1. The right side sonar group 12*d* includes, for example, two sonars. The sonars forming the right side sonar group 12*d* are respectively provided in the front of a right side and in the rear of the right side of the vehicle 1. Instead of or in addition to the sonar groups 12*a*, 12*b*, 12*c*, and 12*d*, the vehicle 1 may be provided with a radar device that emits radio waves (for example, so-called millimeter wave radio waves) to the periphery of the vehicle 1 and receives reflected waves from other objects.

The sensor group 10 further includes, for example, wheel sensors 13*a* and 13*b*, a vehicle speed sensor 14, an operation detection unit 15, and an outside temperature sensor 16. The wheel sensors 13*a* and 13*b* detect rotation angles θa and θb of the wheels (not shown), respectively. The wheel sensors 13*a* and 13*b* may be implemented by angle sensors or may be implemented by displacement sensors. The wheel sensors 13*a* and 13*b* output detection pulses each time the wheels rotate at a predetermined angle. The detection pulses output from the wheel sensors 13*a* and 13*b* can be used to calculate the rotation angles (in other words, the number of rotations) and rotation speeds of the wheels. A movement distance of the vehicle 1 can be calculated based on the rotation angles of the wheels. The wheel sensor 13*a* detects, for example, the rotation angle θa of a left rear wheel. The wheel sensor 13*b* detects, for example, the rotation angle θb of a right rear wheel.

The vehicle speed sensor 14 detects a vehicle speed V that is a travel speed of the vehicle 1, and outputs the detected vehicle speed V to the control device 30. The vehicle speed sensor 14 detects the vehicle speed V based on, for example, rotation of a countershaft of a transmission.

The operation detection unit 15 detects an operation performed by a user (for example, a driver who is an occupant driving vehicle 1. The same applies to the following) using the operation input unit 80 and outputs the detected operation to the control device 30. The operation detection unit 15 detects, for example, a travel mode switching operation for switching a travel mode, an operation of selecting a travel mode, or the like. The operation input unit 80 may be shared with a touch panel 21 (more specifically, a pointing device provided in the touch panel 21) to be described later.

The outside temperature sensor 16 detects an outside temperature around the vehicle 1 (in other words, a temperature outside the vehicle), and outputs the detected outside temperature to the control device 30. The outside temperature sensor 16 is provided, for example, in a front grille (not shown) provided at a front end of a vehicle body of the vehicle 1, and detects the outside temperature based on a temperature of air guided into the front grille.

The navigation device 20 identifies a current position of the vehicle 1 using, for example, a global positioning system (GPS) and guides the user on a route from the current position of the vehicle 1 to a destination. The navigation device 20 includes, for example, a storage device (not shown) including a map information database.

The navigation device 20 includes the touch panel 21 and a speaker 22. The touch panel 21 is implemented by integrating a display device (for example, a liquid crystal display) capable of displaying an image with an input device capable of receiving input of information, and functions as the display device controlled by the control device 30 and as the input device that receives input of various types of information to the control device 30. That is, the touch panel 21 displays various screens under the control of the control device 30, and inputs various commands received from the user to the control device 30. The speaker 22 outputs various types of guidance by voice under the control of the control device 30. The touch panel 21 and the speaker 22 are examples of notification units according to the present disclosure.

The EPS system 40 includes a steering angle sensor 41, a torque sensor 42, an EPS motor 43, a resolver 44, and an electronic control unit (EPS ECU) 45. The steering angle sensor 41 detects a steering angle θst of a steering 46. The torque sensor 42 detects a torque TQ applied to the steering 46. The EPS motor 43 applies a driving force or a reaction force to a steering column 47 coupled to the steering 46, thereby assisting an operation on the steering 46 (in other words, steering). The resolver 44 detects a rotation angle θm of the EPS motor 43.

The EPS ECU 45 includes, for example, an input and output unit, a calculation unit, and a storage unit (all not shown), and controls the entire EPS system 40. The EPS ECU 45 outputs, to the control device 30, information indicating the steering angle θst of the steering 46 detected by the steering angle sensor 41. Further, the EPS ECU 45 may output information indicating a steering speed ω of the steering 46 to the control device 30. The steering speed ω is obtained by, for example, differentiating the steering angle θst with time.

The communication unit 50 is a communication interface that communicates with an external device 2 under the control of the control device 30. That is, the control device 30 can communicate with the external device 2 via the communication unit 50. Examples of the external device 2 include a terminal device (for example, a smartphone) of the user and a server device managed by a manufacturer of the vehicle 1. For example, a mobile communication network such as a cellular line, WI-FI (registered trademark), or Bluetooth (registered trademark) may be adopted for the communication between the vehicle 1 and the external device 2.

The driving force control system 60 includes a drive ECU 61 and can control a driving force of the vehicle 1. The drive ECU 61 includes, for example, an input and output unit, a calculation unit, and a storage unit (all not shown), and controls the driving force of the vehicle 1 by controlling an internal combustion engine, an electric motor, or the like, which is the drive source of the vehicle 1, based on an operation (hereinafter also referred to as an "accelerator operation") of the user on an accelerator pedal 62 provided in the vehicle 1 or an instruction from the control device 30.

The braking force control system 70 includes a brake ECU 71 and can control a braking force of the vehicle 1. The brake ECU 71 includes, for example, an input and output unit, a calculation unit, and a storage unit (all not shown), and controls the braking force of the vehicle 1 by controlling a brake device (not shown) of the vehicle 1 based on an operation (hereinafter also referred to as a "brake operation") of the user on a brake pedal 72 provided in the vehicle 1 or an instruction from the control device 30. The brake device of the vehicle 1 includes, for example, a brake caliper, a cylinder that transmits a hydraulic pressure to the brake caliper, and an electric motor that generates a hydraulic pressure in the cylinder. The brake ECU 71 controls the electric motor of the brake device based on the brake operation or the instruction from the control device 30 to generate the braking force corresponding to the brake operation.

Control Device

The control device 30 is a device (computer) that integrally controls the entire vehicle 1 based on information received from the sensor group 10, the navigation device 20, the EPS system 40, the communication unit 50, the driving force control system 60, the braking force control system 70, and the like.

The control device 30 includes, for example, an input and output unit 31, a control unit 32, and a storage unit 37. The input and output unit 31 is an interface that inputs and outputs data between the inside and the outside of the control device 30 under the control of the control unit 32. The storage unit 37 includes, for example, a nonvolatile storage medium such as a flash memory, and stores various types of information (for example, data and programs) for controlling an operation of the vehicle 1. The storage unit 37 may further include a random access memory (RAM) or the like used as a work area when a processor that implements the control unit 32 executes various types of processing.

The control unit 32 includes, for example, a processor such as a central processing unit (CPU), and controls components of the vehicle 1 by executing programs stored in the storage unit 37 or the like. In the present embodiment, the control unit 32 includes, for example, a setting unit 33, an acquisition unit 34, and a driving assist control unit 35 as functional units implemented by the processor executing programs.

The setting unit 33 has a function of setting any one of the plurality of travel modes of the vehicle 1. As an example, the setting unit 33 sets a travel mode selected by the user among the plurality of travel modes. As another example, the setting unit 33 may automatedly set the travel mode according to a predetermined setting condition.

Here, it is assumed that the vehicle 1 has a normal mode and an off-road mode. That is, the normal mode can also be called a non-off-road mode. The setting unit 33 sets the travel mode selected by the user between the normal mode and the off-road mode. Accordingly, the user can make the vehicle 1 to travel in a desired travel mode (in other words, desired travel characteristics) between the normal mode and the off-road mode.

In the normal mode and the off-road mode, for example, a driving force characteristic according to the driving force control system 60 and/or a braking force characteristic according to the braking force control system 70 are different from each other as travel characteristics of the vehicle 1. As an example, the off-road mode may be a travel mode in which a high torque is obtained at a lower speed than in the normal mode.

The acquisition unit 34 has a function of acquiring information indicating a behavior state of the vehicle 1 or an environment state around the vehicle 1. For example, the acquisition unit 34 acquires information indicating the behavior state of the vehicle 1 or the environment state around the vehicle 1 at a predetermined cycle while the vehicle 1 is being started (in other words, when an ignition power source of the vehicle 1 is turned on).

For example, the acquisition unit 34 acquires information indicating the vehicle speed V as the information indicating the behavior state of the vehicle 1. The information indicating the vehicle speed V can be acquired based on, for example, a detection value of the vehicle speed sensor 14.

The acquisition unit 34 may acquire information indicating an acceleration of the vehicle 1 (hereinafter also simply referred to as "acceleration") as the information indicating the behavior state of the vehicle 1. The information indicating the acceleration can be acquired by, for example, differentiating the vehicle speed V with time. When the vehicle 1 includes an acceleration sensor that detects the acceleration, the acquisition unit 34 may acquire the acceleration based on a detection value of the acceleration sensor.

The acquisition unit 34 may acquire information indicating whether a slip occurs in the wheels of the vehicle 1 as the information indicating the behavior state of the vehicle 1. The information indicating whether the slip occurs in the wheels of the vehicle 1 can be acquired based on, for example, the vehicle speed V and a rotation speed of the wheel. More specifically, for example, when the rotation speed of the wheel is not a predetermined value corresponding to the vehicle speed V, the acquisition unit 34 may acquire information indicating that the slip occurs in the wheels of the vehicle 1. On the other hand, when the rotation speed of the wheel is the predetermined value corresponding to the vehicle speed V, the acquisition unit 34 may acquire information indicating that no slip occurs in the wheels of the vehicle 1. The rotation speed of the wheel can be calculated based on detection results of the wheel sensors **13*a* and 13*b***, for example.

The acquisition unit 34 may acquire, as the information indicating the behavior state of the vehicle 1, information indicating whether there is a rotation number difference (in other words, a rotation speed difference) between a pair of left and right wheels of the vehicle 1. The information indicating whether there is the rotation number difference between the pair of left and right wheels can be acquired based on, for example, a rotation number of the left rear wheel of the vehicle 1 (in other words, the rotation angle θa) and a rotation number of the right rear wheel of the vehicle 1 (in other words, the rotation angle θb). More specifically, for example, when a difference between the rotation angle θa and the rotation angle θb is equal to or larger than a predetermined value, the acquisition unit 34 may acquire information indicating that there is a rotation number difference between the pair of left and right wheels of the vehicle 1. On the other hand, when the difference between the rotation angle θa and the rotation angle θb is smaller than the predetermined value, the acquisition unit 34 may acquire information indicating that there is no rotation number difference between the pair of left and right wheels of the vehicle 1.

The acquisition unit 34 may acquire information indicating an outside temperature around the vehicle 1 as information indicating the environment state around the vehicle 1. The information indicating the outside temperature can be acquired based on, for example, a detection value of the outside temperature sensor 16.

The acquisition unit 34 may acquire the information indicating the environment state around the vehicle 1 based on an image analysis result of a peripheral image obtained by the front camera **11*a* or the like capturing the periphery of the vehicle 1. More specifically, for example, the acquisition unit 34 can acquire information indicating whether the vehicle 1 is traveling off-road (in other words, on a rough road), whether the vehicle 1 is traveling on a snowy road or an icy road, whether the vehicle 1 is traveling on a sandy or gravel road, or whether the vehicle 1** is traveling on a circuit or a test course, based on the image analysis result of the peripheral image.

The driving assist control unit 35 has a function of executing driving assist control for assisting driving of the vehicle 1 by the user. As the driving assist control, the driving assist control unit 35 can execute, for example, collision prevention control for preventing the vehicle 1 from colliding with a target (for example, an obstacle such as a wheel stopper or a curb) around the vehicle 1.

In the collision prevention control, the driving assist control unit 35 issues a predetermined alarm to the user via the touch panel 21, the speaker 22, or another notification unit (for example, a so-called "multi-information display"), brakes the vehicle 1 via the braking force control system 70, or assists steering of the vehicle 1 via the EPS system 40 so as to avoid an obstacle.

In the present embodiment, the driving assist control that can be executed by the driving assist control unit 35 is described as the collision prevention control. However, the driving assist control that can be executed by the driving assist control unit 35 is not limited to the collision prevention control, and may be, for example, road departure mitigation control (also referred to as "RDM") for mitigating departure of the vehicle 1 from a traveling lane, a lane keeping assist system (also referred to as "LKAS") that assists the vehicle 1 to travel while maintaining in the vicinity of a center of the traveling lane, or adaptive cruise control (also referred to as "ACC").

For example, when the normal mode is set by the setting unit 33, the driving assist control unit 35 executes the collision prevention control in response to detection of a target that may collide with the vehicle 1 around the vehicle 1 by the sensor group 10 (for example, a sonar group such as the front sonar group **12*a*). As an example, in this case, when a target whose distance from the vehicle 1 is equal to or smaller than a threshold (for example, 1 [m]) is detected, the driving assist control unit 35 executes the collision prevention control. Accordingly, when the vehicle 1 is in the normal mode, it is possible to prevent the vehicle 1 from colliding with an obstacle by the collision prevention control, and to improve safety of the vehicle 1**.

The driving assist control unit 35 can also execute the collision prevention control when the off-road mode is set by the setting unit 33. However, when the off-road mode is set, the vehicle 1 may be traveling off-road. When the collision prevention control occurs frequently while the vehicle 1 is traveling off-road, drivability of the vehicle 1 may decrease.

Therefore, when the off-road mode is set, the driving assist control unit 35 can execute driving assist limitation control for limiting execution of the collision prevention control (that is, the driving assist control) compared to when the normal mode is set. In the driving assist limitation control, for example, the driving assist control unit 35 prohibits execution of the collision prevention control. That is, in this case, the driving assist control unit 35 does not execute the collision prevention control even if a target that may collide with the vehicle 1 is detected around the vehicle 1.

As another example, in the driving assist limitation control, the driving assist control unit 35 may reduce an execution frequency of the collision prevention control compared to when the driving assist limitation control is not executed (for example, when the normal mode is set). More specifically, in this case, a threshold related to a distance to the target, which is a condition for executing the collision prevention control, may be set to be smaller (for example, 50 [cm]) than a threshold (for example, 1 [m]) when the driving assist limitation control is not executed.

Even if the off-road mode is set, the vehicle 1 may not be traveling off-road. For example, it is assumed that the off-road mode is set even though the vehicle 1 is traveling on an ordinary road because the user forgets to switch to the normal mode after traveling off-road. In such a case, it is also undesirable to limit the collision prevention control from a viewpoint of safety.

Therefore, when the off-road mode is set, the driving assist control unit 35 executes the driving assist limitation control or does not execute the driving assist limitation control according to information acquired by the acquisition unit 34.

For example, when the off-road mode is set and the vehicle speed V is smaller than a predetermined threshold (for example, 10 [km/h]), there is a high possibility that the vehicle 1 is traveling off-road. Therefore, when the off-road mode is set and the vehicle speed V indicated by the information acquired by the acquisition unit 34 is smaller than the threshold, the driving assist control unit 35 executes the driving assist limitation control. Accordingly, it is possible to limit occurrence of excessive collision prevention control that can lead to a decrease in drivability when the vehicle 1 is traveling off-road.

On the other hand, when the off-road mode is set but the vehicle speed V is equal to or larger than the threshold, there is a high possibility that the vehicle 1 is not traveling off-road. Therefore, when the off-road mode is set and the vehicle speed V indicated by the information acquired by the acquisition unit 34 is equal to or larger than the threshold, the driving assist control unit 35 does not execute the driving assist limitation control. Accordingly, when the off-road mode is set but there is a high possibility that the vehicle 1 is not traveling off-road, it is possible to appropriately execute the collision prevention control, and to improve the safety of the vehicle 1.

Instead of the vehicle speed V, for example, based on an image analysis result of a peripheral image captured by the front camera 11*a* or the like, the driving assist control unit may execute the driving assist limitation control when information indicating that the vehicle 1 is traveling off-road is acquired, and may not execute the driving assist limitation control when information indicating that the vehicle 1 is not traveling off-road is acquired.

The control device 30 may further include a display control unit 36 as a functional unit implemented by the processor executing a program.

Here, when the off-road mode is set by the setting unit 33 and the vehicle speed V indicated by the information acquired by the acquisition unit 34 is smaller than the threshold, the display control unit 36 has a function of displaying, on a display unit such as the touch panel 21, an image based on imaging data obtained by the front camera 11*a* or the like imaging the periphery of the vehicle 1.

As an example, when the off-road mode is set and the vehicle speed Vis smaller than the threshold, the display control unit 36 displays a ground view image GV shown in FIG. 2 on the touch panel 21. That is, when the ground view image GV shown in FIG. 2 is displayed on the touch panel 21, the driving assist limitation control described above may be executed.

FIG. 2 is a diagram showing an example of the ground view image GV. As shown in FIG. 2, the ground view image GV is, for example, an image in which a front portion of the vehicle body of the vehicle 1 (more specifically, a front room FRM or the like provided in front of a passenger compartment) is transmitted, and is an image representing a state of a pair of left and right front wheels FWL and FWR, and a ground G therearound. When the off-road mode is set and the vehicle speed Vis smaller than the threshold, in other words, when there is a high possibility that the vehicle 1 is traveling off-road, such a ground view image GV is displayed, whereby it is possible to guide the user to a state of the ground G that is likely to be a blind spot for the user, and to assist the user in off-road traveling (in other words, rough road traveling) on the vehicle 1.

Such a ground view image GV may be set not to be displayed. As an example, the display control unit 36 displays, on the touch panel 21, a non-display setting button B for receiving an operation of hiding the ground view image GV, together with the ground view image GV. When the non-display setting button B is tapped, the display control unit 36 sets the ground view image GV to non-display.

When the ground view image GV is set to non-display as described above, the display control unit 36 does not display the ground view image GV even if the vehicle speed V becomes smaller than the threshold in the off-road mode. When the ground view image GV is set not to be displayed as described above, the driving assist control unit 35 may end the driving assist limitation control and then appropriately execute the collision prevention control. It is preferable that the non-display setting of the ground view image GV can be appropriately cancelled by the user performing a predetermined operation, for example.

FIG. 3 is a diagram showing an example of vehicle control by the control device 30. As shown in a table T1 in FIG. 3, when the normal mode is set, the control device 30 does not execute the driving assist limitation control regardless of a behavior state of the vehicle 1. That is, in this case, the control device 30 appropriately executes the collision prevention control in response to detection of a target (that is, an obstacle) that may collide with the vehicle 1 around the vehicle 1.

When the off-road mode is set, the control device 30 executes or does not execute the driving assist limitation control according to the behavior state of the vehicle 1. Specifically, when the off-road mode is set and the vehicle speed V is smaller than the threshold, the control device 30 executes the driving assist limitation control. That is, in this case, for example, the control device 30 does not execute the collision prevention control even if a target that may collide with the vehicle 1 is detected around the vehicle 1. As described above, in this case, the control device 30 may display the ground view image GV.

On the other hand, when the off-road mode is set and the vehicle speed Vis equal to or larger than the threshold, the control device 30 does not execute the driving assist limitation control. That is, in this case, the control device 30 appropriately executes the collision prevention control in response to detection of a target that may collide with the vehicle 1 around the vehicle 1, as in a case where the normal mode is set. As described above, in this case, the control device 30 may not display the ground view image GV.

Example of Processing Executed by Control Device

Next, an example of processing executed by the control device 30 will be described with reference to FIGS. 4 and 5. For example, the control device 30 repeatedly executes travel mode setting shown in FIG. 4 and collision prevention control shown in FIG. 5 at a predetermined cycle while the vehicle 1 is being started (for example, when an ignition power source is turned on).

Figure 4:
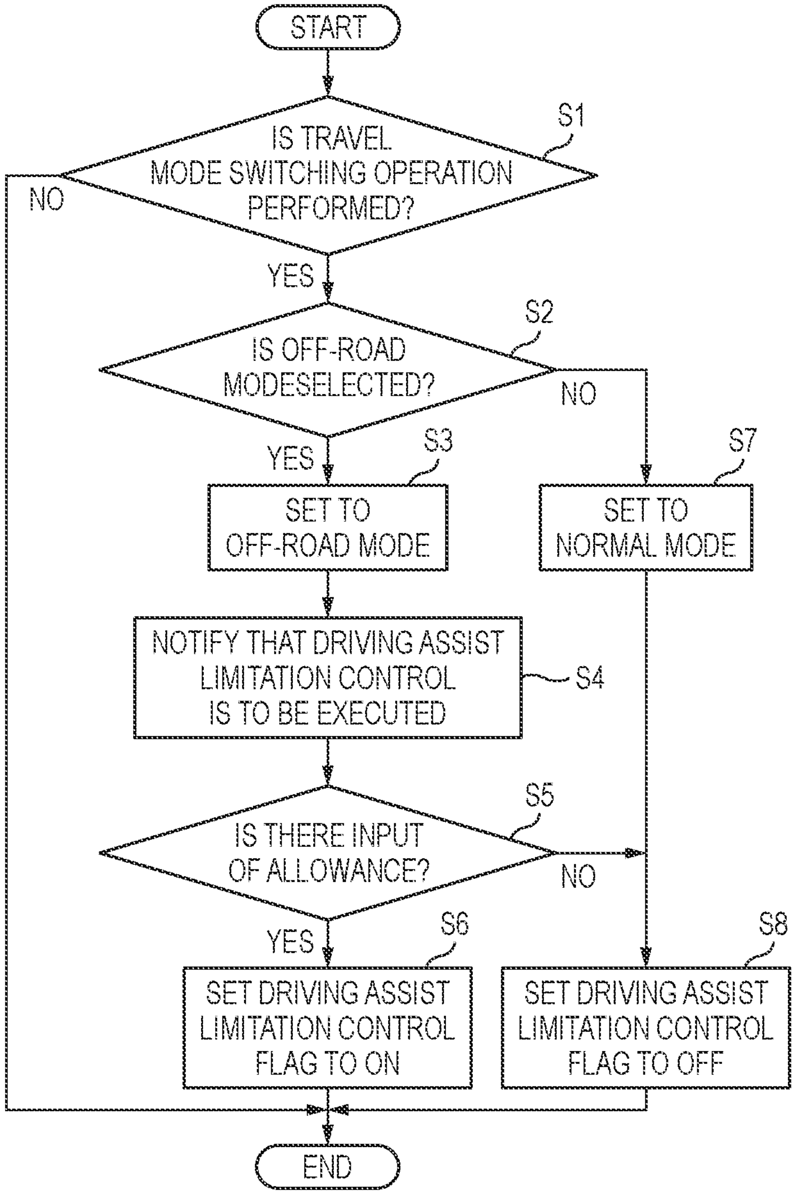
FIG. 4 is a flowchart showing an example of travel mode setting executed by the control device 30.

As shown in FIG. 4, in the travel mode setting, the control device 30 determines whether a travel mode switching operation is performed (step S1). When it is determined that the travel mode switching operation is performed (step S1: YES), the control device 30 determines whether an off-road mode is selected (step S2).

When it is determined that the off-road mode is selected (step S2: YES), the control device 30 sets a travel mode of the vehicle 1 to the off-road mode (step S3), and notifies the user that driving assist limitation control is to be executed (step S4). In the processing of step S4, the control device 30 displays, on the touch panel 21, for example, a message such as "Driving assist limitation control will be executed. Is it OK?", "YES button" for receiving an input to allow execution of the driving assist limitation control, and "NO button" for receiving an input to disallow execution of the driving assist limitation control.

Next, the control device 30 determines whether there is an input to allow execution of the driving assist limitation control in response to a notification by the processing of step S4 (step S5). In the processing of step S5, for example, when the "YES button" is tapped, the control device 30 determines that there is an input to allow execution of the driving assist limitation control, and when the "NO button" is tapped, the control device 30 determines that there is no input to allow execution of the driving assist limitation control.

When it is determined that there is the input to allow execution of the driving assist limitation control (step S5: YES), the control device 30 sets a driving assist limitation control flag indicating execution of the driving assist limitation control to on (step S6), and ends the series of processing shown in FIG. 4.

On the other hand, in the processing of step S2, when it is determined that a normal mode is selected (step S2: NO), the control device 30 sets the travel mode of the vehicle 1 to the normal mode (step S7), sets the driving assist limitation control flag to off (step S8), and ends the series of processing shown in FIG. 4.

In the processing of step S5, when it is determined that there is no input to allow execution of the driving assist limitation control (step S5: NO), the control device 30 proceeds to the processing of step S8, sets the driving assist limitation control flag to off, and ends the series of processing shown in FIG. 4. Accordingly, even if the off-road mode is set, it is possible to prevent the driving assist limitation control from being executed against an intention of the user.

Figure 5:
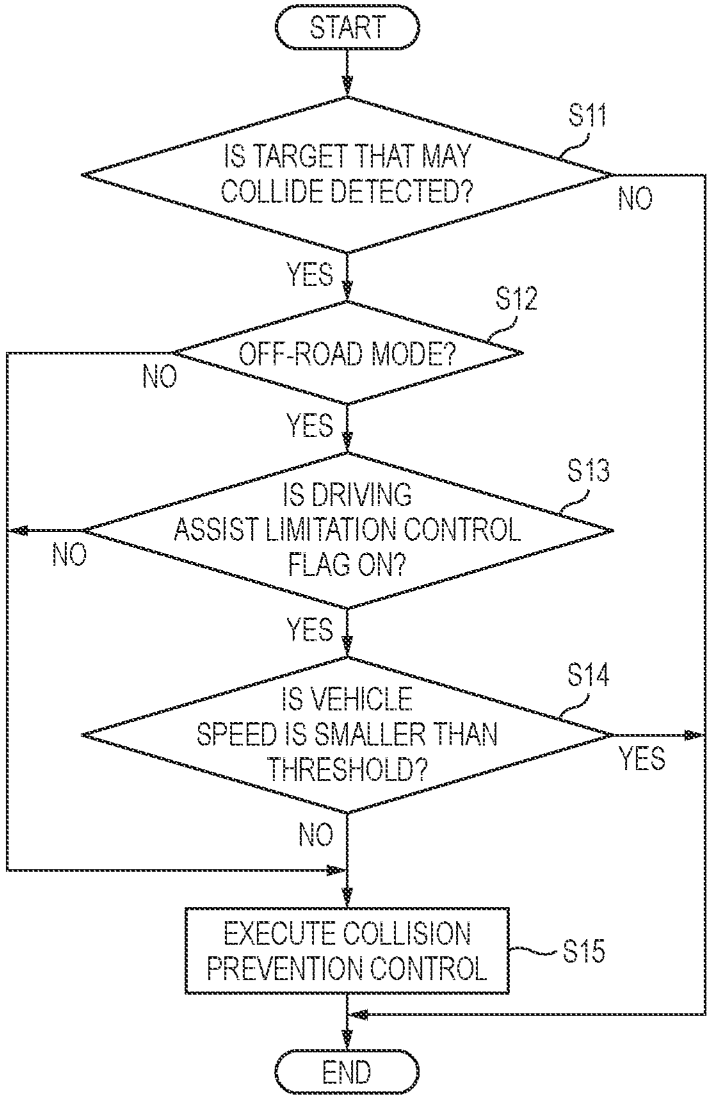
FIG. 5 is a flowchart showing an example of collision prevention control executed by the control device 30.

As shown in FIG. 5, in the collision prevention control, the control device 30 determines whether a target that may collide with the vehicle 1 is detected around the vehicle 1 (step S11). When it is determined that no target that may collide with the vehicle 1 is detected (step S11: NO), the control device 30 ends the series of processing shown in FIG. 5.

When it is determined that the target that may collide with the vehicle 1 is detected (step S11: YES), the control device 30 determines whether the currently set travel mode is the off-road mode (step S12). When it is determined that the mode is the off-road mode (step S12: YES), the control device 30 determines whether the driving assist limitation control flag is on (step S13).

When it is determined that the driving assist limitation control flag is on (step S13: YES), the control device 30 determines whether the vehicle speed V is smaller than a threshold (step S14). When it is determined that the vehicle speed V is smaller than the threshold (step S14: YES), the control device 30 ends the series of processing shown in FIG. 5. That is, in this case, the collision prevention control is not to be executed.

On the other hand, when it is determined that the vehicle speed Vis equal to or larger than the threshold (step S14: NO), the control device 30 executes the collision prevention control (step S15) and ends the series of processing shown in FIG. 5.

In the processing of step S12, when it is determined that the currently set travel mode is not the off-road mode, that is, the normal mode (step S12: NO), the control device 30 proceeds to the processing of step S15 to execute the collision prevention control, and ends the series of processing shown in FIG. 5.

In the processing of step S13, when it is determined that the driving assist limitation control flag is off (step S13: NO), the control device 30 proceeds to the processing of step S15 to execute the collision prevention control, and ends the series of processing shown in FIG. 5.

As described above, according to a configuration of the present embodiment, it is possible to prevent the driving assist limitation control from being executed when the vehicle 1 is in the off-road mode and a behavior state of the vehicle 1 is a predetermined state (for example, the vehicle speed Vis 10 [km/h] or larger) while assuming that the driving assist limitation control is executed when the vehicle 1 is in the off-road mode. Accordingly, it is possible to prevent occurrence of inconvenience caused by the driving assist limitation control being always executed when the vehicle 1 is in the off-road mode without any effort of the user, and to improve convenience and/or safety of the vehicle 1. In addition, it is possible to improve traffic safety and contribute to development of a sustainable transportation system.

According to the configuration of the present embodiment, when the off-road mode is set but there is a high possibility that the vehicle 1 is not traveling off-road, it is possible not to execute the driving assist limitation control, and it is possible to improve the convenience and/or safety of the vehicle 1.

For example, the driving assist limitation control flag is turned off by switching from the off-road mode to the normal mode and the driving assist limitation control is ended in the example described above, but the present disclosure is not limited thereto.

For example, the control device 30 (more specifically, the driving assist control unit 35) may end the driving assist limitation control when the off-road mode is set and a behavior state of the vehicle 1 or an environment state of the vehicle 1 transitions to a predetermined state (for example, when the vehicle speed V transitions from a state of smaller than 10 [km/h] to a state of 10 [km/h] or larger). As described above, when the behavior state of the vehicle 1 or the environment state around the vehicle 1 transitions to the predetermined state, it is possible to automatedly end the driving assist limitation control, and to improve the convenience of the vehicle 1.

The vehicle 1 has the normal mode and the off-road mode in the example described above, but the present disclosure is not limited thereto. Hereinafter, an example in which the vehicle 1 has a travel mode other than the off-road mode will be described. In the following description, portions different from those in the above-described example will be mainly described, and description of portions common to those in the above-described example will be appropriately omitted or simplified.

First Modification

First, a first modification in which the vehicle 1 has a normal mode and a snow mode will be described. That is, in this example, the normal mode can also be called a non-snow mode.

FIG. 6 is a diagram showing an example of vehicle control by the control device 30 according to the first modification. For example, when the snow mode is set and an outside temperature around the vehicle 1 is equal to or lower than a threshold (for example, 0 [° C.]), there is a high possibility that the vehicle 1 is traveling on a snowy road or an icy road. On the other hand, when the snow mode is set but the outside temperature around the vehicle 1 is higher than the threshold, there is a high possibility that the vehicle 1 is not traveling on the snowy road or the icy road.

As shown in a table T2 in FIG. 6, when the normal mode is set, the control device 30 does not execute the driving assist limitation control regardless of an outside temperature (that is, an environment state) around the vehicle 1. That is, in this case, the control device 30 appropriately executes the driving assist control such as the collision prevention control.

When the snow mode is set, the control device 30 executes or does not execute the driving assist limitation control according to the outside temperature around the vehicle 1. Specifically, when the snow mode is set and information indicating that an outside temperature around the vehicle 1 is equal to or lower than a threshold (for example, 0 [° C.]) is acquired by the acquisition unit 34, the control device 30 (more specifically, the driving assist control unit 35) executes the driving assist limitation control. That is, in this case, the control device 30 does not execute the driving assist control such as the collision prevention control.

On the other hand, when the snow mode is set and information indicating that the outside temperature around the vehicle 1 is higher than the threshold is acquired by the acquisition unit 34, the control device 30 (more specifically, the driving assist control unit 35) does not execute the driving assist limitation control. That is, in this case, the control device appropriately executes the driving assist control such as the collision prevention control, as in a case where the normal mode is set.

Instead of the outside temperature around the vehicle 1, for example, the control device 30 may execute the driving assist limitation control when information indicating that a slip occurs in the wheels of the vehicle 1 is acquired, and may not execute the driving assist limitation control when information indicating that no slip occurs is acquired.

For example, based on an image analysis result of a peripheral image captured by the front camera 11*a* or the like, the control device 30 may execute the driving assist limitation control when information indicating that the vehicle 1 is traveling on a snowy road is acquired, and may not execute the driving assist limitation control when information indicating that the vehicle 1 is not traveling on the snowy road is acquired.

As described above, according to a configuration of the first modification, it is possible to prevent the driving assist limitation control from being executed when the vehicle 1 is in the snow mode and a behavior state of the vehicle 1 or an environment state around the vehicle 1 is a predetermined state while assuming that the driving assist limitation control is executed when the vehicle 1 is in the snow mode. Accordingly, it is possible to prevent occurrence of inconvenience caused by the driving assist limitation control being always executed when the vehicle 1 is in the snow mode without any effort of the user, and to improve convenience and/or safety of the vehicle 1.

According to the configuration of the first modification, when the snow mode is set but there is a high possibility that the vehicle 1 is not traveling on the snowy road or the icy road, it is possible not to execute the driving assist limitation control, and it is possible to improve the convenience and/or safety of the vehicle 1.

Second Modification

Next, a second modification in which the vehicle 1 has a normal mode and a sand mode will be described. That is, in this example, the normal mode can also be called a non-sand mode.

FIG. 7 is a diagram showing an example of vehicle control by the control device 30 according to the second modification. For example, when the sand mode is set and a slip occurs in the wheels of the vehicle 1 or there is a rotation number difference between a pair of left and right wheels of the vehicle 1, there is a high possibility that the vehicle 1 is traveling on a sandy or gravel road. On the other hand, when the sand mode is set but no slip occurs in the wheels of the vehicle 1 or there is no rotation number difference between the pair of left and right wheels of the vehicle 1, there is a high possibility that the vehicle 1 is not traveling on the sandy or gravel road.

As shown in a table T3 in FIG. 7, when the normal mode is set, the control device 30 does not execute the driving assist limitation control regardless of a behavior state of the vehicle 1. That is, in this case, the control device 30 appropriately executes the driving assist control such as the collision prevention control.

When the sand mode is set, the control device 30 executes or does not execute the driving assist limitation control according to the behavior state of the vehicle 1. Specifically, when the sand mode is set and information indicating that a slip occurs in the wheels of the vehicle 1 or that there is a rotation number difference between a pair of left and right wheels of the vehicle 1 is acquired by the acquisition unit 34, the control device 30 (more specifically, the driving assist control unit 35) executes the driving assist limitation control. That is, in this case, the control device 30 does not execute the driving assist control such as the collision prevention control.

On the other hand, when the sand mode is set and information indicating that no slip occurs in the wheels of the vehicle 1 or that there is no rotation number difference between the pair of left and right wheels of the vehicle 1 is acquired by the acquisition unit 34, the control device 30 (more specifically, the driving assist control unit 35) does not execute the driving assist limitation control. That is, in this case, the control device 30 appropriately executes the driving assist control such as the collision prevention control, as in a case where the normal mode is set.

For example, based on an image analysis result of a peripheral image captured by the front camera 11*a* or the like, the control device 30 may execute the driving assist limitation control when information indicating that the vehicle 1 is traveling on a sandy or gravel road is acquired, and may not execute the driving assist limitation control when information indicating that the vehicle 1 is not traveling on the sandy or gravel road is acquired.

As described above, according to a configuration of the second modification, it is possible to prevent the driving assist limitation control from being executed when the vehicle 1 is in the sand mode and a behavior state of the vehicle 1 or an environment state around the vehicle 1 is a predetermined state while assuming that the driving assist limitation control is executed when the vehicle 1 is in the sand mode. Accordingly, it is possible to prevent occurrence of inconvenience caused by the driving assist limitation control being always executed when the vehicle 1 is in the sand mode without any effort of the user, and to improve convenience and/or safety of the vehicle 1.

According to the configuration of the second modification, when the sand mode is set but there is a high possibility that the vehicle 1 is not traveling on the sandy or gravel road, it is possible not to execute the driving assist limitation control, and it is possible to improve the convenience and/or safety of the vehicle 1.

Third Modification

Next, a third modification in which the vehicle 1 has a normal mode and a track mode will be described. That is, in this example, the normal mode can also be called a non-track mode.

FIG. 8 is a diagram showing an example of vehicle control by the control device 30 according to the third modification. For example, when the track mode is set and the vehicle speed V or an acceleration of the vehicle 1 is equal to or larger than a threshold, there is a high possibility that the vehicle 1 is traveling on a circuit or a test course. On the other hand, when the track mode is set but the vehicle speed V or the acceleration of the vehicle 1 is smaller than the threshold, there is a high possibility that the vehicle 1 is not traveling on the circuit or the like.

As shown in a table T4 in FIG. 8, when the normal mode is set, the control device 30 does not execute the driving assist limitation control regardless of a behavior state of the vehicle 1. That is, in this case, the control device 30 appropriately executes the driving assist control such as the collision prevention control.

When the track mode is set, the control device 30 executes or does not execute the driving assist limitation control according to the behavior state of the vehicle 1. Specifically, when the track mode is set and information indicating that the vehicle speed V or the acceleration of the vehicle 1 is equal to or larger than the threshold is acquired by the acquisition unit 34, the control device 30 (more specifically, the driving assist control unit 35) executes the driving assist limitation control. That is, in this case, the control device 30 does not execute the driving assist control such as the collision prevention control.

On the other hand, when the track mode is set and the information indicating that the vehicle speed V or the acceleration of the vehicle 1 is smaller than the threshold is acquired by the acquisition unit 34, the control device 30 (more specifically, the driving assist control unit 35) does not execute the driving assist limitation control. That is, in this case, the control device 30 appropriately executes the driving assist control such as the collision prevention control, as in a case where the normal mode is set.

For example, based on an image analysis result of a peripheral image captured by the front camera 11*a* or the like, the control device 30 may execute the driving assist limitation control when information indicating that the vehicle 1 is traveling on a circuit or the like is acquired, and may not execute the driving assist limitation control when information indicating that the vehicle 1 is not traveling on the circuit or the like is acquired.

As described above, according to a configuration of the third modification, it is possible to prevent the driving assist limitation control from being executed when the vehicle 1 is in the track mode and a behavior state of the vehicle 1 or an environment state around the vehicle 1 is a predetermined state while assuming that the driving assist limitation control is executed when the vehicle 1 is in the track mode. Accordingly, it is possible to prevent occurrence of inconvenience caused by the driving assist limitation control being always executed when the vehicle 1 is in the track mode without any effort of the user, and to improve convenience and/or safety of the vehicle 1.

According to the configuration of the third modification, when the track mode is set but there is a high possibility that the vehicle 1 is not traveling on the circuit or the like, it is possible not to execute the driving assist limitation control, and it is possible to improve the convenience and/or safety of the vehicle 1.

The control method described in the present embodiment can be implemented by executing a program prepared in advance on a computer. The program is stored in a computer-readable storage medium and executed by being read from the storage medium. In addition, the program may be provided in a form stored in a non-volatile (non-transitory) storage medium such as a flash memory, or may be provided via a network such as the Internet. The computer that executes the program may be provided in the vehicle 1 or may be provided in the external device 2 (for example, a server device) capable of communicating with the vehicle 1.

Although an embodiment of the present disclosure has been described above, it goes without saying that the present disclosure is not limited to the embodiment. It is apparent that those skilled in the art can conceive of various modifications and changes within the scope described in the claims, and it is understood that such modifications and changes naturally fall within the technical scope of the present disclosure. In addition, the components according to the embodiment described above may be freely combined without departing from the gist of the disclosure.

An example in which the moving body according to the present disclosure is the vehicle 1 that is a four-wheeled automobile has been described in the above embodiment, but the present disclosure is not limited thereto. The moving body according to the present disclosure may also be a two-wheeled automobile (so-called motorcycle), a ship or an aircraft.

In the present specification and the like, at least the following matters are described. Although corresponding components or the like according to the embodiment described above are shown in parentheses, the present disclosure is not limited thereto.

(1) There is provided a moving body (vehicle 1) having a plurality of travel modes with different travel characteristics, and the moving body includes:

a control device (control device 30), in which the control device comprises:

a setting unit (setting unit 33) configured to set any one of the plurality of travel modes;

an acquisition unit (acquisition unit 34) configured to acquire information indicating a behavior state of the moving body or an environment state around the moving body; and a driving assist controller configured to execute driving assist control for assisting driving of the moving body, and the driving assist controller (driving assist control unit 35) executes the driving assist control when a first travel mode is set by the setting unit, the driving assist controller is configured to execute driving assist limitation control for limiting execution of the driving assist control more than when the first travel mode is set, when a second travel mode different from the first travel mode is set, the driving assist controller executes the driving assist limitation control when the second travel mode is set and the behavior state or the environment state indicated by the information acquired by the acquisition unit is a first state, and the driving assist controller does not execute the driving assist limitation control when the second travel mode is set and the behavior state or the environment state indicated by the information acquired by the acquisition unit is a second state different from the first state.

According to (1), it is possible to prevent the driving assist limitation control from being executed when the moving body is in the second travel mode and the behavior state of the moving body or the environment state around the moving body is a predetermined state (the second state) while assuming that the driving assist limitation control is executed when the moving body is in the second travel mode. Accordingly, it is possible to prevent occurrence of inconvenience caused by the driving assist limitation control being always executed when the moving body is in the second travel mode without any effort of a user, and to improve convenience and/or safety of the moving body.

(2) In the moving body according to (1), the driving assist controller ends the driving assist limitation control when the second travel mode is set and the behavior state or the environment state transitions from the first state to the second state.

According to (2), when the behavior state of the moving body or the environment state around the moving body transitions to the predetermined state, it is possible to automatedly end the driving assist limitation control, and to improve the convenience of the moving body.

(3) In the moving body according to (1) or (2), the driving assist controller executes, as the driving assist control, collision prevention control for preventing the moving body from colliding with a target around the moving body.

According to (3), by executing the collision prevention control as the driving assist control, it is possible to prevent the moving body from colliding with the target around the moving body, and to improve safety of the moving body.

(4) In the moving body according to any one of (1) to (3), in the driving assist limitation control, the driving assist controller prohibits execution of the driving assist control or reduces an execution frequency of the driving assist control compared to when the driving assist limitation control is not executed.

According to (4), it is possible to limit excessive execution of the driving assist control by the driving assist limitation control.

(5) In the moving body according to any one of (1) to (4), when the second travel mode is set, the control device notifies, via a notification unit mounted on the moving body, a user of the moving body that the driving assist limitation control is to be executed, and the driving assist controller executes the driving assist limitation control when there is an input to allow execution of the driving assist limitation control in response to the notification.

According to (5), even if the second travel mode is set, it is possible to prevent the driving assist limitation control from being executed against an intention of the user.

(6) In the moving body according to any one of (1) to (5), the moving body has a non-off-road mode as the first travel mode and an off-road mode as the second travel mode, the acquisition unit acquires information indicating a travel speed of the moving body as the information indicating the behavior state, the driving assist controller executes the driving assist limitation control, when the off-road mode is set and the moving body is in the first state where the travel speed indicated by the information acquired by the acquisition unit is smaller than a predetermined threshold, and the driving assist controller does not execute the driving assist limitation control, when the off-road mode is set and the moving body is in the second state where the travel speed indicated by the information acquired by the acquisition unit is equal to or greater than the threshold.

According to (6), when the off-road mode is set but there is a high possibility that the moving body is not traveling off-road, it is possible not to execute the driving assist limitation control, and it is possible to improve the convenience and/or safety of the moving body.

(7) In the moving body according to (6), the control device further includes a display controller configured to display, on a display unit provided in the moving body, an image based on imaging data obtained by imaging a periphery of the moving body when the off-road mode is set and the vehicle is in the first state.

According to (7), it is possible to assist the user in off-road traveling (in other words, rough road traveling) on the moving body using the image based on the imaging data obtained by imaging the periphery of the moving body.

(8) In the moving body according to any one of (1) to (5), the moving body has a non-snow mode as the first travel mode and a snow mode as the second travel mode, the acquisition unit acquires information indicating an outside temperature around the moving body as the information indicating the environment state, the driving assist controller executes the driving assist limitation control, when the snow mode is set and the vehicle is the first state where the outside temperature indicated by the information acquired by the acquisition unit is equal to or lower than a predetermined threshold, and the driving assist controller does not execute the driving assist limitation control, when the snow mode is set and the vehicle is in the second state where the outside temperature indicated by the information acquired by the acquisition unit is higher than the threshold in the second state.

According to (8), when the snow mode is set but there is a high possibility that the moving body is not traveling on a snowy road or an icy road, it is possible not to execute the driving assist limitation control, and it is possible to improve the convenience and/or safety of the moving body.

(9) In the moving body according to any one of (1) to (5), the moving body has a non-sand mode as the first travel mode and a sand mode as the second travel mode, the acquisition unit acquires, as the information indicating the behavior state, information indicating whether a slip occurs in a wheel of the moving body or whether there is a difference in a number of rotations between a pair of left and right wheels of the moving body, the driving assist controller executes the driving assist limitation control, when the sand mode is set and the vehicle is in the first mode where the information acquired by the acquisition unit indicates that the slip occurs or there is the difference in the number of rotations, and the driving assist controller does not execute the driving assist limitation control, when the sand mode is set and the vehicle is in the second state where the information acquired by the acquisition unit indicates that no slip occurs or there is no difference in the number of rotations.

According to (9), when the sand mode is set but there is a high possibility that the moving body is not traveling on a sandy or gravel road, it is possible not to execute the driving assist limitation control, and it is possible to improve the convenience and/or safety of the moving body.

(10) In the moving body according to any one of (1) to (5), the moving body has a non-track mode as the first travel mode and a track mode as the second travel mode, the acquisition unit acquires information indicating a travel speed or an acceleration of the moving body as the information indicating the behavior state, the driving assist controller executes the driving assist limitation control, when the track mode is set and the vehicle is in the first state where the travel speed or the acceleration indicated by the information acquired by the acquisition unit is equal to or larger than a predetermined threshold, and the driving assist controller does not execute the driving assist limitation control, when the track mode is set and the vehicle is in the second state where the travel speed or the acceleration indicated by the information acquired by the acquisition unit is smaller than the threshold.

According to (10), when the track mode is set but there is a high possibility that the moving body is not traveling on a circuit or the like, it is possible not to execute the driving assist limitation control, and it is possible to improve the convenience and/or safety of the moving body.

(11) There is provided a control method performed by a computer (control device 30, control unit 32) that controls a moving body (vehicle 1) having a plurality of travel modes with different travel characteristics, the control method comprising:

setting any one of the plurality of travel modes (step S3, step S7);

acquiring information indicating a behavior state of the moving body or an environment state around the moving body; and executing (step S15) driving assist control for assisting driving of the moving body, wherein the executing comprises:

executing the driving assist control when a first travel mode is set by processing of the first step;

executing driving assist limitation control for limiting execution of the driving assist control more than when the first travel mode is set, when a second travel mode different from the first travel mode is set;

executing the driving assist limitation control when the second travel mode is set and the behavior state or the environment state indicated by the information acquired by processing of the second step is a first state; and not executing the driving assist limitation control when the second travel mode is set and the behavior state or the environment state indicated by the information acquired by the processing of the second step is a second state different from the first state.

According to (11), it is possible to prevent the driving assist limitation control from being executed when the moving body is in the second travel mode and the behavior state of the moving body or the environment state around the moving body is a predetermined state (the second state) while assuming that the driving assist limitation control is executed when the moving body is in the second travel mode. Accordingly, it is possible to prevent occurrence of inconvenience caused by the driving assist limitation control being always executed when the moving body is in the second travel mode without any effort of the user, and to improve convenience and/or safety of the moving body.

(12) A computer-readable storage medium storing a program for causing a computer to execute the control method according to (11).

According to (12), it is possible to cause a computer to execute the control method according to (11).

The invention claimed is:

1. A moving body having a plurality of travel modes with different travel characteristics, the moving body comprising:

a control device, wherein the control device comprises circuitry configured to:

set any one of the plurality of travel modes;

acquire information indicating a behavior state of the moving body or an environment state around the moving body;

execute driving assist control for assisting driving of the moving body;

execute the driving assist control when a first travel mode is set;

execute driving assist limitation control for limiting execution of the driving assist control more than when the first travel mode is set, when a second travel mode different from the first travel mode is set;

execute the driving assist limitation control when the second travel mode is set and the behavior state or the environment state indicated by the acquired information is a first state; and not execute the driving assist limitation control when the second travel mode is set and the behavior state or the environment state indicated by the acquired information is a second state different from the first state, wherein the information indicating the behavior state of the moving body or the environment state around the moving body is acquired when the second travel mode is set.

2. The moving body according to claim 1, wherein the circuitry is further configured to end the driving assist limitation control when the second travel mode is set and the behavior state or the environment state transitions from the first state to the second state.

3. The moving body according to claim 1, wherein the circuitry is further configured to execute, as the driving assist control, collision prevention control for preventing the moving body from colliding with a target around the moving body.

4. The moving body according to claim 1, wherein in the driving assist limitation control, the circuitry is further configured to prohibit execution of the driving assist control or reduce an execution frequency of the driving assist control compared to when the driving assist limitation control is not executed.

5. The moving body according to claim 1, wherein when the second travel mode is set, the control device notifies, via a display or a speaker mounted on the moving body, a user of the moving body that the driving assist limitation control is to be executed, and the circuitry is further configured to execute the driving assist limitation control when there is an input to allow execution of the driving assist limitation control in response to the notification.

6. The moving body according to claim 1, wherein the moving body has a non-off-road mode as the first travel mode and an off-road mode as the second travel mode, and the circuitry is further configured to acquire information indicating a travel speed of the moving body as the information indicating the behavior state, execute the driving assist limitation control, when the off-road mode is set and the moving body is in the first state where the travel speed indicated by the acquired information is smaller than a predetermined threshold, and not execute the driving assist limitation control, when the off-road mode is set and the moving body is in the second state where the travel speed indicated by the acquired information is equal to or greater than the threshold.

7. The moving body according to claim 6, wherein the circuitry is further configured to control a displaying of, on a display provided in the moving body, an image based on imaging data obtained by imaging a periphery of the moving body when the off-road mode is set and the moving body is in the first state.

8. The moving body according to claim 1, wherein the moving body has a non-snow mode as the first travel mode and a snow mode as the second travel mode, and the acquires circuitry is further configured to acquire information indicating an outside temperature around the moving body as the information indicating the environment state, execute the driving assist limitation control, when the snow mode is set and the moving body is in the first state where the outside temperature indicated by the acquired information is equal to or lower than a predetermined threshold, and not execute the driving assist limitation control, when the snow mode is set and the moving body is in the second state where the outside temperature indicated by the acquired information is higher than the threshold in the second state.

9. The moving body according to claim 1, wherein the moving body has a non-sand mode as the first travel mode and a sand mode as the second travel mode, and the circuitry is further configured to acquire, as the information indicating the behavior state, information indicating whether a slip occurs in a wheel of the moving body or whether there is a difference in a number of rotations between a pair of left and right wheels of the moving body, execute the driving assist limitation control, when the sand mode is set and the moving body is in the first state where the acquired information indicates that the slip occurs or there is the difference in the number of rotations, and not execute the driving assist limitation control, when the sand mode is set and the moving body is in the second state where the acquired information indicates that no slip occurs or there is no difference in the number of rotations.

10. The moving body according to claim 1, wherein the moving body has a non-track mode as the first travel mode and a track mode as the second travel mode, and the circuitry is further configured to acquire information indicating a travel speed or an acceleration of the moving body as the information indicating the behavior state, execute the driving assist limitation control, when the track mode is set and the moving body is in the first state where the travel speed or the acceleration indicated by the acquired information is equal to or larger than a predetermined threshold, and not execute the driving assist limitation control, when the track mode is set and the moving body is in the second state where the travel speed or the acceleration indicated by the acquired information is smaller than the threshold.

11. A control method performed by a computer that controls a moving body having a plurality of travel modes with different travel characteristics, the control method comprising:

setting any one of the plurality of travel modes;

acquiring information indicating a behavior state of the moving body or an environment state around the moving body; and executing driving assist control for assisting driving of the moving body, wherein the executing comprises:

executing the driving assist control when a first travel mode is set;

executing driving assist limitation control for limiting execution of the driving assist control more than when the first travel mode is set, when a second travel mode different from the first travel mode is set;

executing the driving assist limitation control when the second travel mode is set and the behavior state or the environment state indicated by the acquired information is a first state; and not executing the driving assist limitation control when the second travel mode is set and the behavior state or the environment state indicated by the acquired information is a second state different from the first state, and wherein the information indicating the behavior state of the moving body or the environment state around the moving body is acquired when the second travel mode is set.

12. A non-transitory computer-readable storage medium storing a program for causing a computer to execute the control method according to claim 11.

* * * * *